US 6,544,662 B2

(12) United States Patent
Rabinkin et al.

(10) Patent No.: US 6,544,662 B2
(45) Date of Patent: Apr. 8, 2003

(54) PROCESS FOR MANUFACTURING OF BRAZED MULTI-CHANNELED STRUCTURES

(75) Inventors: Anatol Rabinkin, Morris Plains, NJ (US); Nicholas DeCristofaro, Chatham, NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/427,379

(22) Filed: Oct. 25, 1999

(65) Prior Publication Data

US 2002/0150788 A1 Oct. 17, 2002

(51) Int. Cl.$^7$ .................. B32B 15/00; B32B 15/18; F28F 21/08
(52) U.S. Cl. .................. 428/594; 428/680; 428/679; 428/685; 165/905
(58) Field of Search .................. 428/685, 680, 428/679, 594; 165/905, 180; 228/262.42, 245

(56) References Cited

U.S. PATENT DOCUMENTS

| 4,148,973 A | | 4/1979 | Sexton et al. ................ 428/680 |
| 4,480,016 A | * | 10/1984 | Henschel |
| 4,515,305 A | * | 5/1985 | Hagemeister |
| 4,621,031 A | | 11/1986 | Scruggs ........................ 428/627 |
| 4,745,037 A | | 5/1988 | DeCristofaro et al. ....... 428/678 |
| 4,801,072 A | * | 1/1989 | Henschel |
| 5,553,770 A | * | 9/1996 | Jha et al. |
| 5,964,398 A | | 10/1999 | Kohno et al. ................ 228/194 |
| 5,971,255 A | | 10/1999 | Yamamoto et al. .......... 228/181 |
| 6,200,690 B1 | * | 3/2001 | Rabinkin |

FOREIGN PATENT DOCUMENTS

| DE | 1 602 298 | 4/1970 | .......... B21T/37/22 |
| EP | 0 263 324 | 4/1988 | .............. F01N/3/28 |
| JP | 01-048697 | 2/1989 | |

OTHER PUBLICATIONS

PCT Search Report dated Mar. 5, 2001.
English Abstract for 1 602 298 (no date).
English Abstract for 0 263 324 (no date).
A. Rabinkin, et al. "Effect of Load on Brazing with MET-GLAS MBF–2005 Filler Metal", Welding Journal, vol. 67, N5, (1988), pp. 33–45.

* cited by examiner

Primary Examiner—John J. Zimmerman
Assistant Examiner—Jason Savage
(74) Attorney, Agent, or Firm—Roger H. Criss (57) ABSTRACT

A process is disclosed for brazing plate/plate and plate/fin multi-channeled structures using an amorphous brazing foil as a brazing filler metal between the parts in order to form uniform joints having optimal dimensions, shape and strength. The parts are assembled in an unconstrained stack, and a controlled load is applied to the top of the stack. The stack is then heated to a temperature at which the interlayer melts and reacts with the base metal to form the joints. The stack is cooled resulting in a brazed structure having the desired characteristics, wherein the brazed joints are optimally formed and the strength of the structure is equal to the underlying strength of the base metal.

23 Claims, 6 Drawing Sheets

Before Brazing

After Brazing

PROCESS FOR MANUFACTURING OF BRAZED MULTI-CHANNELED STRUCTURES

BACKGROUND OF THE INVENTION

This invention relates to a manufacturing method of brazing uniform plate/plate and plate/fin multi-channeled structures using an amorphous brazing foil as a brazing filler metal.

FIELD OF THE INVENTION

Description of the Prior Art

Brazing is a process for joining metal parts, often of dissimilar composition, to each other. Typically, a brazing filler metal that has a melting point lower than that of the base metal parts to be joined is interposed between the parts to form an assembly. The assembly is then heated to a temperature sufficient to melt the brazing filler metal. Upon cooling, a strong and preferably corrosion resistant joint is formed.

One class of products produced by brazing processes is the heat exchanger, a three-dimensional structure comprised of alternating metal flat plates and fins or corrugated plates kept in tight, physical contact. Brazed joints mechanically connect and seal the contact areas between the flat plates and fins, as in the case of plate/fin heat exchangers or between the stamped corrugations in the plate/plate case. The corrugation profiles may have a chevron pattern, pressed-out indentations of various circular forms or some other profiles. In the brazed state these indentations are joined with flat plates or with each other forming an elaborate system of channels or interlocking cavities. In service, hot and cool liquids and/or gasses flow separately in these channels exchanging heat. In many cases, these structures are made from heat and corrosion resistant steels and operate at high temperatures as coolers in utility systems, as heat exchangers in aerospace structures, and as recuperators in chemical, food and other process industries.

The majority of multi-channeled brazed structures are produced using a filler metal placed between the base metal parts prior to the actual brazing process. Filler metal in powder form can be sprayed onto the surfaces of the base metal parts or applied in the form of a powder/polymer composite paste. In either case, filler metal in powder form is porous and contains considerable impurities in the form of oxides. The use of powder filler metals in this manner results in uneven, porous and poor quality joints. Alternately, filler metal in foil form can be placed directly between the base metal parts to be joined. Foil, by comparison, is 100% dense, carries fewer impurities and can be more accurately metered in the joint area. The use of foil in constrained assemblies, while being much more effective than powder, necessitates small variations in the foil thickness. This is particularly important when these assembled alternating base metal plates and foil preforms are constrained from mutual movement during brazing.

To optimize the brazed structure performance, one needs to conduct tedious, preliminary experiments to determine the proper amount of powder or foil relative to the base metal plate thickness and geometry. Moreover, constrained assemblies require that all parts have very precise dimensions and a very accurate part placement that is difficult and expensive to satisfy using the existing technology. To illustrate, consider corrugated sheet in a plate/plate heat exchanger that is 250 mm wide by 100 mm long by 0.1 mm thick, with a channel height of 5 mm. An optimized brazed joint will have a gap of 0.025 to 0.050 mm. A 1% variation in the channel height will cause the gap to change by 0.05 mm. A 1% deflection in the flatness of the sheet will cause the gap to change by 1 mm. The only way to seal these local large gaps is to fill them with brazing filler metal. When the gaps are large, but the amount of available filler metal is small or the filler metal has poor flow, then filling of the excessive gaps may not be sufficient in a mechanically constrained assembly of plates and preforms. As a result, there may be large unbrazed areas.

A properly designed heat exchanger must contain the liquids and/or gases in their appropriate channels and must safely withstand the pressure exerted upon it by the fluid media. These design criteria apply to each brazed joint in the stricture. The joint strength is a parameter determined by the joint size and microstructure. It is affected by the time-temperature brazing conditions. Given the larger number of joints in a heat exchanger, joint strength and integrity are rather difficult to predict and, even more, difficult to regulate. In the ideal case of high strength joint, a potential failure of the brazed structure under the critical internal pressure would occur in the structural parts made of the base metal rather than in the brazed joint.

Steel heat exchangers are typically brazed with Cu, Ni- or Co-based filler metals. Cu filler metal is available in foil form. The use of Cu, however, is limited to heat exchangers that experience moderate temperature and contain minimally corrosive media. Ni- and Co-based filler metals produce brazed joints capable of withstanding high temperatures and moderately corrosive media. The majority of Ni- and Co-based advanced filler metals that can be used for joining these structures contain a substantial amount of metalloid elements such as boron, silicon and/or phosphorus. Consequently, such alloys are very brittle in conventional crystalline form and available only as powders, powder-binder pastes and tapes and bulky cast preforms. Powders and powder-based preforms do not easily permit brazing of complex forms. However, these Ni- and Co-based alloys can be transformed into a ductile, flexible foil that is produced utilizing rapid solidification technology and which has an amorphous structure in the solid state. Such amorphous alloys for brazing applications are disclosed in many patents, for example U.S. Pat. Nos. 4,148,973 and 4,745,037. In spite of substantial advantages of rapid solidification technology achieved so far, the foil thus produced has cross-sectional and longitudinal thickness variations, sometimes exceeding ±40%.

Thus, there is a continuing need for an improved method of brazing complex three-dimensional plate/plate and plate/fin structures that can provide strong joints with controlled cross-section dimensions without being overly dependent on: (a) brazing foil thickness and its variations; and (b) the shape and accuracy of dimensions of fins and profiles.

There exists experimental data showing the beneficial effect of load applied normal to the joints of specimens subjected to brazing operations. In each of these specimens, amorphous metal foil was used as the brazing filler metal. The brazed joint thickness varied with the applied load. This data indicates the importance of load in the improvement of liquid filler metal wetting of rough gap surfaces and formation of non-porous brazes. Moreover, the self-adjusting interplay between the surface tension of a liquid filler metal and the applied load also optimizes the thickness, the microstructure and, most importantly, the strength of the brazement. This fundamental load effect provides the scientific basis for the proposed method of the present invention to improve brazed multi-channeled structures.

SUMMARY OF INVENTION

This invention is embodied in a brazing method comprising the steps of interposing an interlayer in an amorphous foil form between plates and fins to be joined, assembling parts in an unconstrained stack, applying a controlled load on the top of the stack, heating the assembly under suitable conditions to a temperature at which the interlayer melts and reacts with the base metal parts, and cooling the assembly to produce a structure with uniform joints having optimal dimensions, shape and strength.

The invention also comprises a brazed structure produced by the method described hereinabove.

BRIEF DESCRIPTION OF THE DRAWINGS

Details of the invention, and of certain preferred embodiments thereof, will be better understood upon reference to the drawings, wherein.

DETAILED DESCRIPTION OF THE INVENTION

To guarantee a leak resistant product, brazed multi-channeled structures must have complete brazements at each contact surface. In addition, to assure extended service life, these brazements must be uniform and strong.

The mechanical performance of the device is characterized by three primary parameters: 1) the maximum burst pressure that can be resisted by the brazed structure, 2) the long-term dimensional stability of the structure against sustained pressure, and 3) the long-term mechanical stability of the structure against variable pressure and temperature.

Figure 1:
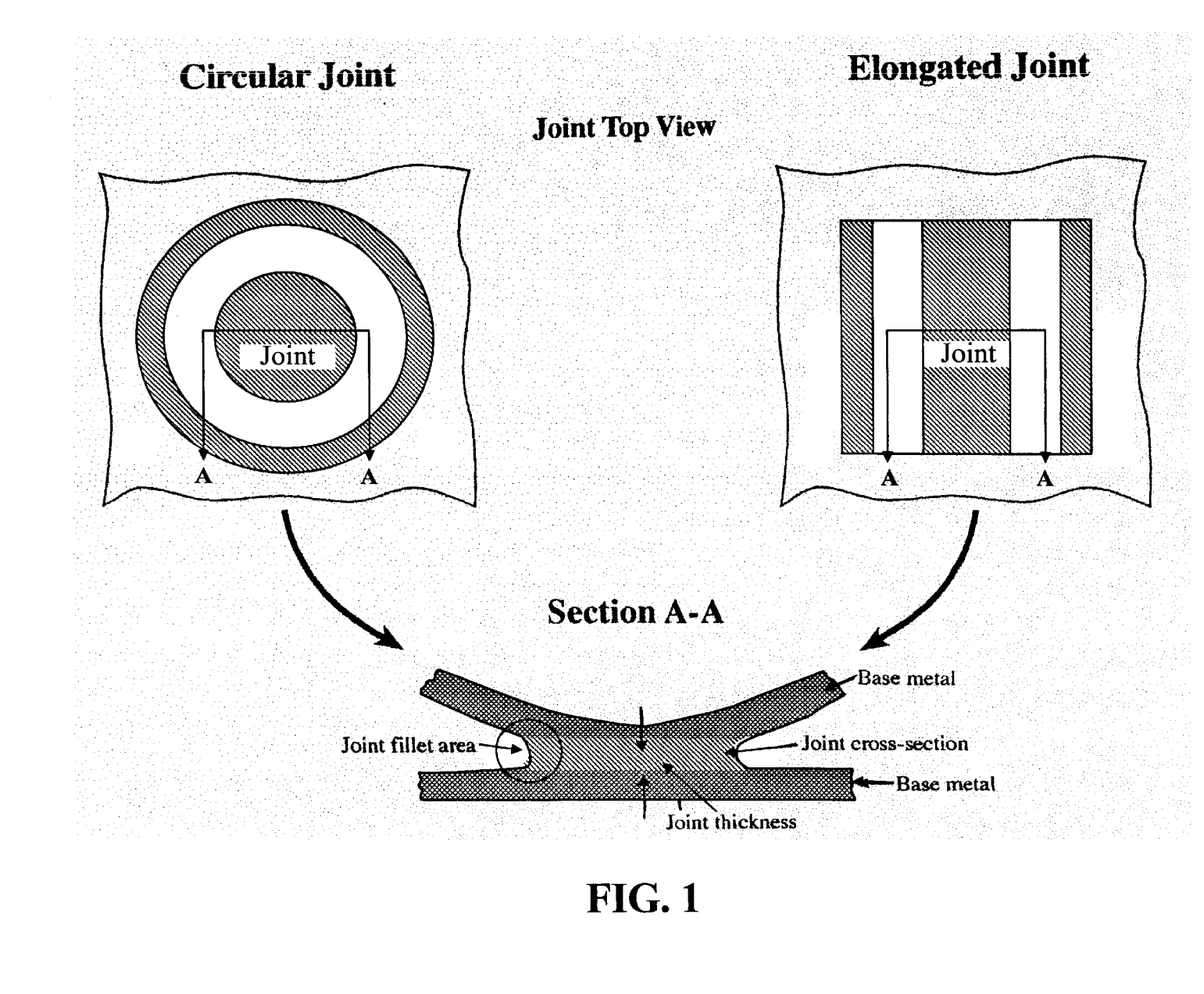
FIG. 1(a) is a top view of a circular joint formed in a brazed heat exchanger.
FIG. 1(b) is a top view of an elongated joint formed in a brazed heat exchanger.
FIG. 1(c) is a cross-sectional view of the joints shown in FIG. 1(a) and in FIG. 1(b) formed in a brazed heat exchanger.

The device may fail at either the brazed joints or within the base metal structural members. If the device fails at the brazed joints, the strength is determined by the total contact surface of joints and the strength of the brazements. If it fails in the base metal structural members, the strength is determined by the cross-section area and the intrinsic strength of the structural members. These regions in the device are illustrated in FIG. 1.

Figure 2:
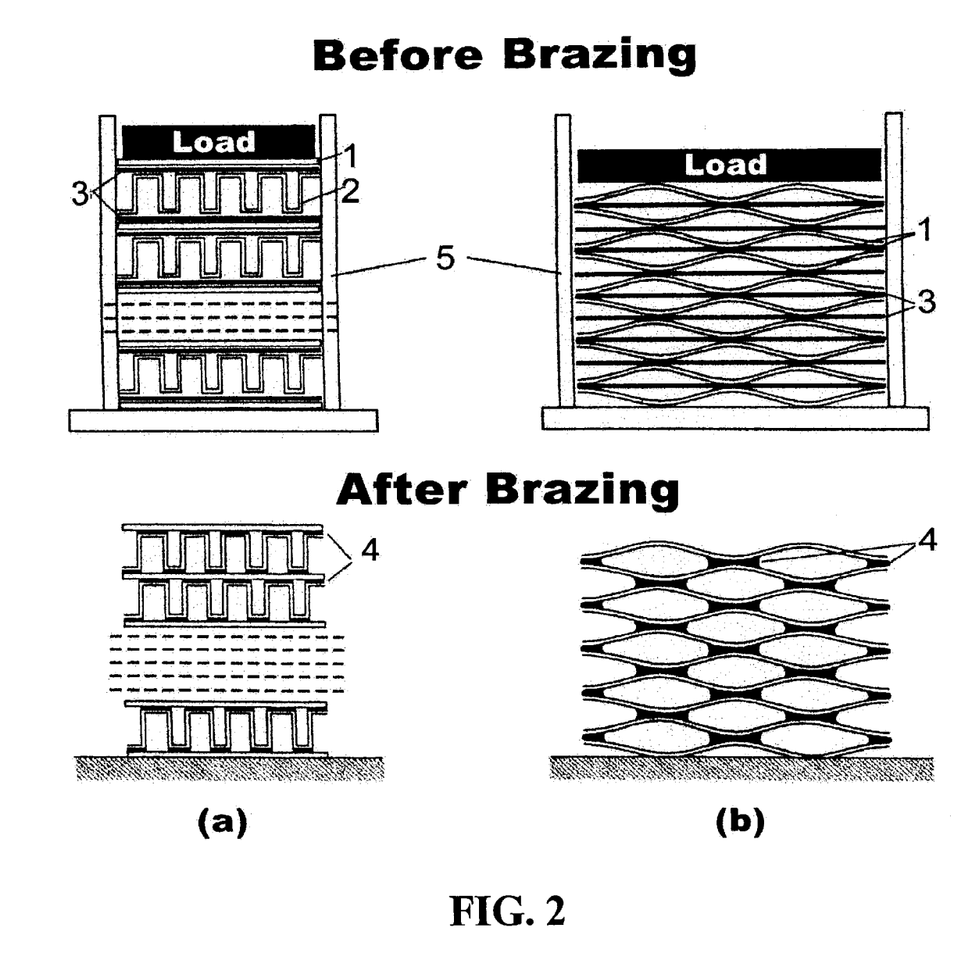
FIG. 2(a) is a schematic view of a plate/fin assembly before and after brazing.
FIG. 2(b) is a schematic view of a plate/plate assembly before and after brazing.

In accordance with the invention, a method is provided to manufacture a uniform, non-leaking, strong, multi-channeled plate/fin and plate/plate brazed structure in which an amorphous foil can be used as a filler metal. The method consists of the following steps:

(a) a filler metal in foil form with an amorphous structure and with a melting temperature that is less than the melting temperature of the base metal plate and fin parts is chosen;

(b) plates 1, fins 2 and brazing filler metal preforms 3 are assembled within a supporting device 5 according to the sequences shown in FIG. 2, such that they can move freely in the vertical direction but are prevented from moving laterally during the brazing operation;

(c) a compressive load is applied to the assembly by placing a fixed amount of weight on the top of the stack as shown in FIG. 2. The compressive loads should not cause the stack to collapse at the brazing temperature;

(d) the assembly is placed in a furnace and is heated to at least the melting temperature of the filler metal; and (e) the assembly is cooled.

Under these conditions, the brazing filler metal melts and fills the initial gaps between parts being brazed, as shown in FIG. 2 "After Brazing." Simultaneously, and most specifically, the applied load adjusts the gaps of each individual brazement being formed to about 15 $\mu$m to 30 $\mu$m, depending on the load. This occurs by moving the base metal parts either closer together or further apart until movement stops due to equilibrium between the applied load and the surface tension forces of the molten metal in the gaps. Excessive molten metal is partially expelled out of the brazed gaps forming fillets with large cross-sections and resulting in high strength joints. The overall dimensions of the brazed structure are controlled regardless of variations in thickness of foils used and the uniformity of the plate/fin. Moreover, all formed channels of the structure attain equal cross-sections.

Foils useful in the process described above typically are on average about 37 to about 60 $\mu$m thick, which is also the desired spacing between parts to be joined. Such spacing maximizes the strength of the brazed joints. Thinner foils may result in insufficient amounts of liquid filler metal to fill all potential excessive gaps. Thicker foils are not economical and may not be needed because the failure of the structure described in the present invention would occur not in the brazed joints but rather in the base metal parts. Accordingly, the ideal performance of the brazed structure is achieved wherein the failure is determined by the strength of the base metal.

EXAMPLE

In order to illustrate the forgoing, samples were supplied that were manufactured in accordance with the following general concepts of the present invention.

Flat plates were stamped and sinusoidal shape fins were formed from UNS4360 stainless steel sheets having 100 $\mu$m and 50 $\mu$m thickness, respectively. An abrasive water jet cutting method was used to cut flat filler metal preforms in a foil form from Ni-based amorphous alloy within American Welding Specification ANSI/A5.8 for BNi-2.

Figure 3:
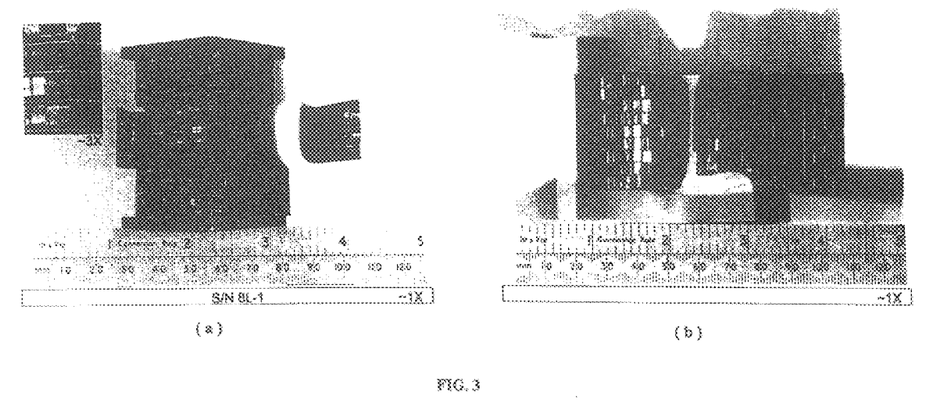
FIG. 3(a) is a photograph of a sample used to demonstrate an embodiment of the invention before mechanical testing at 650° C.
FIG. 3(b) is a photograph of a sample used to demonstrate an embodiment of the invention after mechanical testing at 650° C.

Amorphous foils of 25 μm, 37 μm, and 50 μm average thickness were used but their across-the-web profiles, measured by a profilometer with a thin tipped probe, had local troughs as deep as 15–20 μm. Three samples were assembled as stacks of 16 identical part sets. Each set consisted of the plate/preform/fin/preform/plate parts. Upon brazing, each of the 16 sets became a plurality of sealed channels simulating the channels in actual heat exchangers. Each sample was comprised of identical base metal plate and fin members for all samples but contained foil preforms having one of the above mentioned thicknesses. Each sample was assembled between vertical guides attached to a thick plate of a special holder permitting all stack parts to move freely in the vertical direction during a complete brazing cycle. A load was placed on the top of each sample in the form of a metal or graphite block as shown in FIG. 2. The loaded samples in structure 5 were placed in a vacuum furnace in the vertical position and brazed at a temperature of approximately 1090° C. for 15 min. After brazing, the samples were prepared for mechanical testing. They were cut and then machined by the electrical discharge method into specimens with I-beam shapes having about a 25 mm×25 mm cross-section in the specimen "neck," as depicted in FIG. 3(a). The cutout pieces were used to prepare metallographic samples. The joint dimensions and microstructure, as a function of the preform thickness, were measured using an optical microscope under a moderate 100× magnification.

Figure 4:
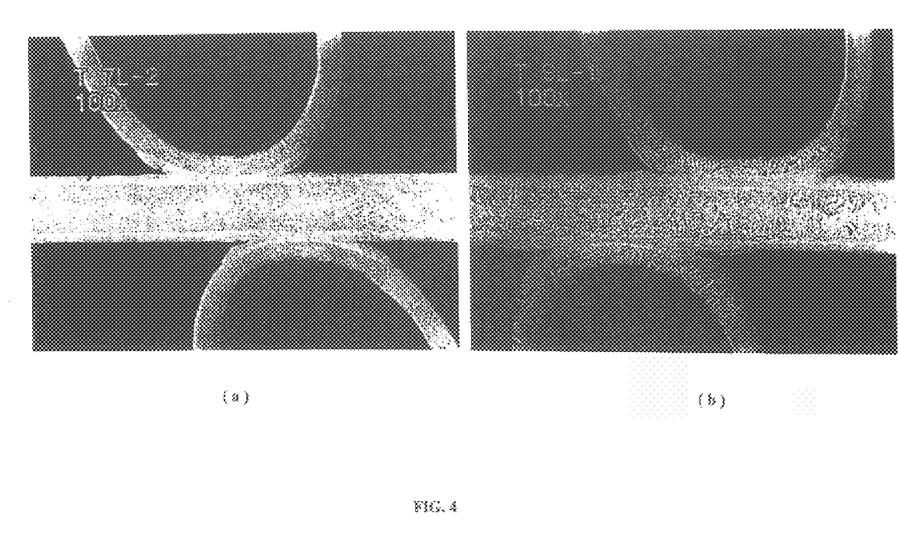
FIG. 4(a) is a photograph of the microstructure of a stainless steel joint brazed using 25 $\mu$m thick amorphous foils.
FIG. 4(b) is a photograph of the microstructure of a stainless steel joint brazed using 50 $\mu$m thick amorphous foils.

Metallographic observations showed that the joint thickness in the middle portion of all brazes is the same regardless of the thickness of the virgin amorphous foil, even when comparing samples manufactured using 25 μm and 50 μm foils as FIGS. 4a and 4b demonstrate. This effect was observed because brazing gaps were not constrained. Indeed, the excess liquid MBF-20 alloy was partially expelled from the capillary gaps upon melting until the surface tension forces at all gap surfaces became equal to the total load applied to the specimen, the total load being the parts weight and the weight of the external block. This excessive molten MBF-20 metal, particularly in the 50 μm foil, flowed out of the initial gaps forming large fillets and partially climbed up on the vertical walls of the fins. The thicker filler metal resulted in larger joint fillets which had advantageous shapes without a narrow cavity-like crystallization shrinkage pattern seen in FIG. 4a and, therefore, larger joint cross-sections as depicted in FIG. 4b.

The height of formed individual passages in all brazed specimens was measured using a standard optical comparator with the following results:

| Filler metal thickness, mm (mil*) | Average passage height, mm (mil*) | Total height of 16 passages, mm (mil*) |
| --- | --- | --- |
| 25 μm | 3.282 (129.21) | 52.514 (2067.5) |
| 37 μm | 3.287 (129.4) | 52.590 (2070.5) |
| 50 μm | 3.284 (129.3) | 52.557 (2069.2) |

*Unit in which these parameters were measured.

Because sixteen brazing foils were preplaced in each of the samples, the initial difference between assembled packs with 25 μm and 50 μm thick foils was 0.4 mm. This difference decreases to near zero in the brazed structures. The total difference in heights of these two samples in the brazed state is only 0.042 mm.

The I-beam shaped brazed samples were tensile tested at 650° C. using a standard tensile testing machine. The samples evidenced the following maximum load at failure, and this load varied linearly with the foil thickness:

| Filler metal thickness, mm (mil*) | Maximum load at sample failure at 650° C., kg (lbf*) |
| --- | --- |
| 25 μm | 342 (754) |
| 37 μm | 429 (946) |
| 50 μm | 537 (1183) |

Figure 5:
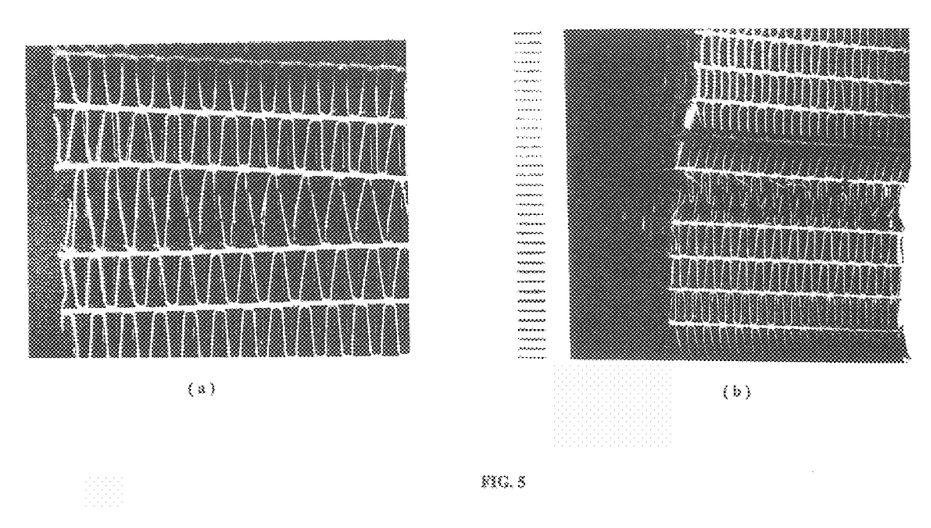
FIG. 5(a) is a photograph showing a side view of a sample after failure under tensile mode mechanical testing at 650° C. showing the failure location in the brazed joint.
FIG. 5(b) is a photograph showing a side view of a sample after failure under tensile mode mechanical testing at 650° C. showing the failure location in the base metal.
Figure 6:
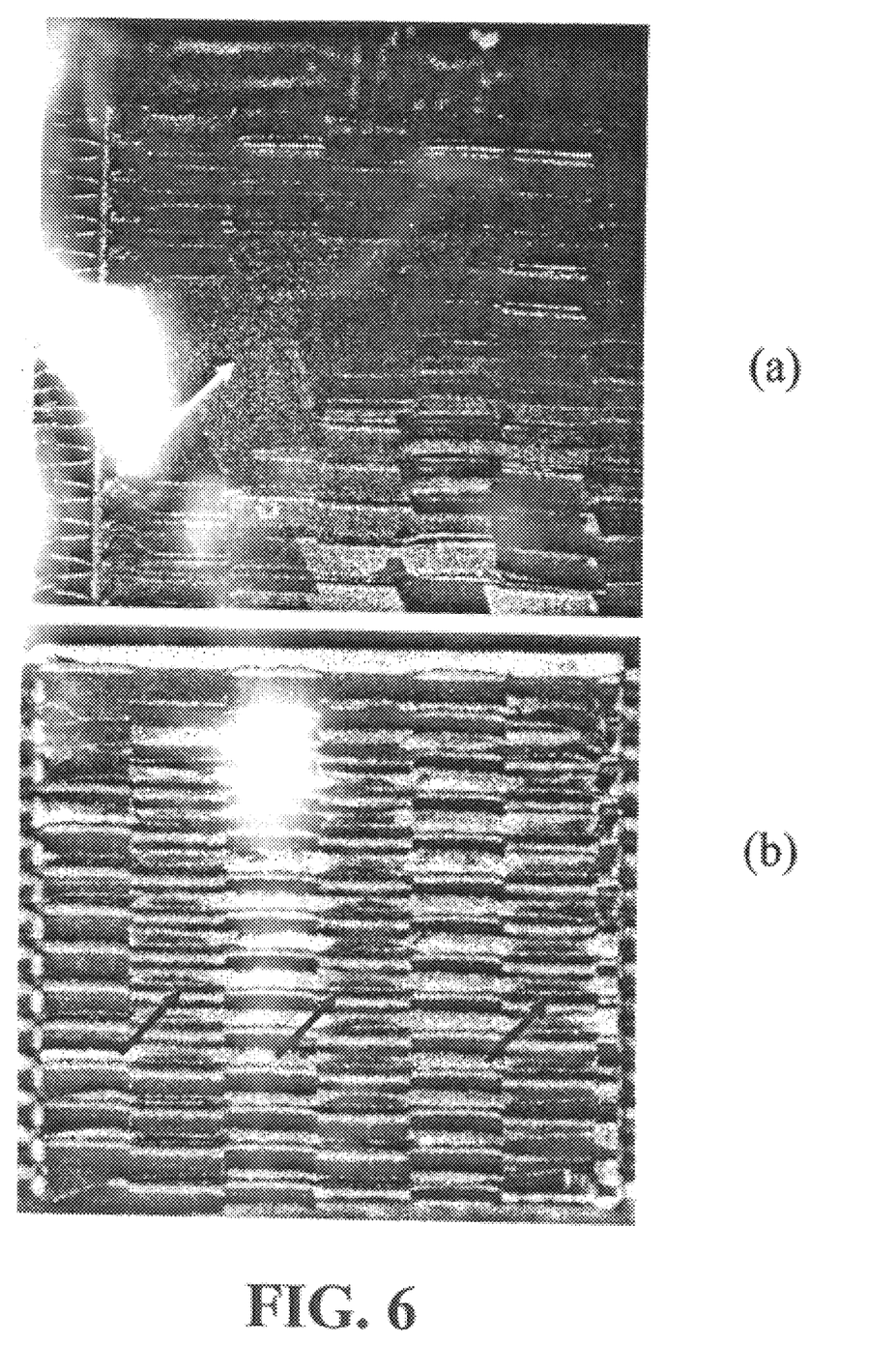
FIG. 6 is a photograph showing a view of two halves of a sample manufactured with a thin (25$\mu$m) preplaced amorphous brazing filler metal in a foil form showing a large unbrazed area due to presence of a small dent in the fin.

Optical observations of the failed samples under a moderate 20× magnification, as depicted in FIGS. 5a and 5b, showed that in samples brazed using 25 μm and 37 μm average thickness foils, the failure occurred in the brazements, as depicted in FIG. 5a. Also, in some samples brazed using 25 μm foil, large unbrazed spots were observed due to an insufficient amount of brazed filler metal needed to fill occasional dents or other defects in the fin form, as FIG. 6 demonstrates. In the case of the 50 μm foil sample, the failure occurred in the middle of the fins, as depicted in FIG. 5b. Therefore, in this case the strength of the brazed structure was determined ideally by the strength of the base metal.

Having thus described the invention in rather full detail it will be understood that such detail need not be strictly adhered to but that various changes and modifications may suggest themselves to one skilled in the art, all falling within the scope of the invention as defined by subjoined claims.

We claim:

1. A brazed article comprising parts selected from the group consisting of plates and fins, manufactured in accordance with a method for brazing the parts together comprising the steps of:

a) providing a metallic interlayer in amorphous foil form;

b) assembling the parts in a stack consisting of multiple plates and fins separated by said metallic interlayer of amorphous foil, whereby the stack is unconstrained from movement in the vertical direction and constrained from movement in the lateral direction;

c) applying a controlled load on top of said stack acting in a vertical direction;

d) heating said stack to a temperature at which said interlayer melts and reacts with the base metal of the parts; and e) cooling said stack to produce the brazed article containing a plurality of sealed channels, whereby each joint between parts has optimum geometry with uniform dimensions and equal strength.

2. A brazed article according to claim 1, wherein the parts are made from a material selected from the group consisting of series 300 stainless steels and series 400 stainless steels.

3. A brazed article according to claim 1, wherein the parts are made from a material consisting of high temperature, precipitation hardening superalloys.

4. A brazed article according to claim 1, wherein the parts are made from a material consisting of heat resistant, high chromium, low carbon steels.

5. A brazed article according to claim 1, wherein the parts are formed by powder metallurgy means, and consist of a dispersion-hardened alloy comprising iron, chromium, aluminum and yttria.

6. A brazed article according to claim 1, wherein the parts are made from a material consisting of low alloyed, low carbon steels.

7. A brazed article according to claim 1, wherein the strength of the article is essentially equal to the strength of the base metal of the article.

8. A brazed article according to claim 1, wherein the parts are made from metals.

9. A brazed article according to claim 1, wherein said interlayer is comprised of flat preforms of amorphous metal foil.

10. A brazed article according to claim 9, wherein said amorphous metal foil interlayer has a thickness between about 25 $\mu$m to about 60 $\mu$m.

11. A brazed article according to claim 9, wherein said amorphous metal foil interlayer has a thickness between about 371 $\mu$m to about 50 $\mu$m.

12. A brazed article according to claim 1, wherein the value of the controlled load on top of the stack acting in a vertical direction does not exceed the value of the load that will cause the stack to collapse at the brazing temperature.

13. A brazed article according to claim 1, wherein the brazed joints between parts are of a uniform thickness and have full-bodied fillets formed to completely seal all brazing gaps without residual pores, resulting in a structure that resists leakage.

14. A multi-channeled brazed structure comprising:

a) a plurality of parts selected from the group consisting of plates and fins, the parts having been assembled in a stack that is unconstrained from movement in the vertical direction and constrained from movement in the lateral direction, and wherein a controlled load has been applied on top of the stack acting in a vertical direction; and b) a metallic amorphous foil interlayer between said parts, the stack having been heated to a temperature at which the amorphous foil interlayer has melted and reacted with the base metal of the parts and then cooled forming a plurality of brazed joints between said parts, each joint having optimum geometry with essentially uniform dimensions and equal strength; wherein the tensile and shear strength of each brazed joint is essentially equal to the tensile and shear strength of the base metal of the structure.

15. A brazed structure according to claim 14, wherein the plates and fins are each made from metals.

16. A brazed structure according to claim 14, wherein said amorphous metal foil interlayer has a thickness between about 25 $\mu$m to about 60 $\mu$m.

17. A structure according to claim 14, wherein said brazed joints are of an essentially uniform thickness and have full-bodied fillets formed to completely seal all brazing gaps without residual pores, resulting in a structure that resists leakage.

18. A structure according to claim 14, wherein the parts are made from a material selected from the group consisting of series 300 and series 400 stainless steels.

19. A structure according to claim 14, wherein the parts are made from a material consisting of high temperature, precipitation hardening superalloys.

20. A brazed structure according to claim 14, wherein the parts are made from a material consisting of heat resistant, high chromium, low carbon steels.

21. A brazed structure according to claim 14, wherein the parts are formed by powder metallurgy means, and consist of a dispersion-hardened alloy comprising iron, chromium, aluminum and yttria.

22. A brazed structure according claim 14, wherein the parts are made from a material consisting of low alloyed, low carbon steels.

23. A brazed structure according to claim 14, wherein said amorphous metal foil interlayer has an average thickness between about 37 $\mu$m to about 50 $\mu$m.

* * * * *